US012712725B2

(12) United States Patent
Lee et al.

(10) Patent No.: US 12,712,725 B2
(45) Date of Patent: Aug. 18, 2026

(54) ELECTRONIC DEVICE FOR DATA ISOLATION AND METHOD OF OPERATING THE SAME

(71) Applicant: SAMSUNG ELECTRONICS CO., LTD., Suwon-si (KR)

(72) Inventors: Seung-Ho Lee, Suwon-si (KR); Myung-Sik Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 430 days.

(21) Appl. No.: 18/358,597

(22) Filed: Jul. 25, 2023

(65) Prior Publication Data

US 2024/0275588 A1 Aug. 15, 2024

(30) Foreign Application Priority Data

Jan. 16, 2023 (KR) ........................ 10-2023-0006345

(51) Int. Cl.
*H04L 9/08* (2006.01)
*G06F 21/62* (2013.01)

(52) U.S. Cl.
CPC .......... *H04L 9/088* (2013.01); *G06F 21/6209* (2013.01)

(58) Field of Classification Search
CPC ..... H04L 9/088; H04L 9/0825; H04L 9/0844; H04L 9/0894; H04L 9/0861; H04L 9/3263; G06F 21/6209; G06F 21/44; G06F 21/60; G06F 21/62; G06F 21/57; G06F 21/602; G06F 21/606; G06F 21/64; G06F 21/78; G06F 21/53; G06F 21/33; G06F 2221/2107
See application file for complete search history.

(56) References Cited

U.S. PATENT DOCUMENTS

| | | | |
|---|---|---|---|
| 10,387,064 B2 | 8/2019 | Kim | |
| 11,392,687 B2 * | 7/2022 | Cheng | H04L 9/30 |
| 11,841,970 B1 * | 12/2023 | Fan | G06F 21/31 |
| 2005/0256878 A1 | 11/2005 | Brown et al. | |
| 2018/0082077 A1 | 3/2018 | Schentrup et al. | |
| 2019/0005260 A1 | 1/2019 | Qiu | |
| 2021/0109870 A1 | 4/2021 | Sahita et al. | |
| 2021/0176230 A1 * | 6/2021 | Cho | H04L 63/045 |
| 2022/0123921 A1 | 4/2022 | Chu | |
| 2022/0191031 A1 | 6/2022 | Haider et al. | |
| 2022/0353057 A1 * | 11/2022 | Arunachalam | H04L 9/14 |

FOREIGN PATENT DOCUMENTS

KR 10-2020-00135849 10/2020

OTHER PUBLICATIONS

GlobalPlatformTechnology TEE Internal Core API Specification, Version 1.1.2.50 (Target v1.2) Jun. 2018.

* cited by examiner

*Primary Examiner* — Han Yang
(74) *Attorney, Agent, or Firm* — Morgan, Lewis & Bockius LLP

(57) ABSTRACT

An electronic device includes a storage device, including a secure area assigned to a trusted application and a normal area, and a processor configured to generate a user identifier, assigned to the trusted application, based on the trusted application and device information and to manage data requested for the secure area from the trusted application based on the user identifier. The device information includes at least one of information associated with the storage device and information associated with the processor.

20 Claims, 10 Drawing Sheets

FIG. 12

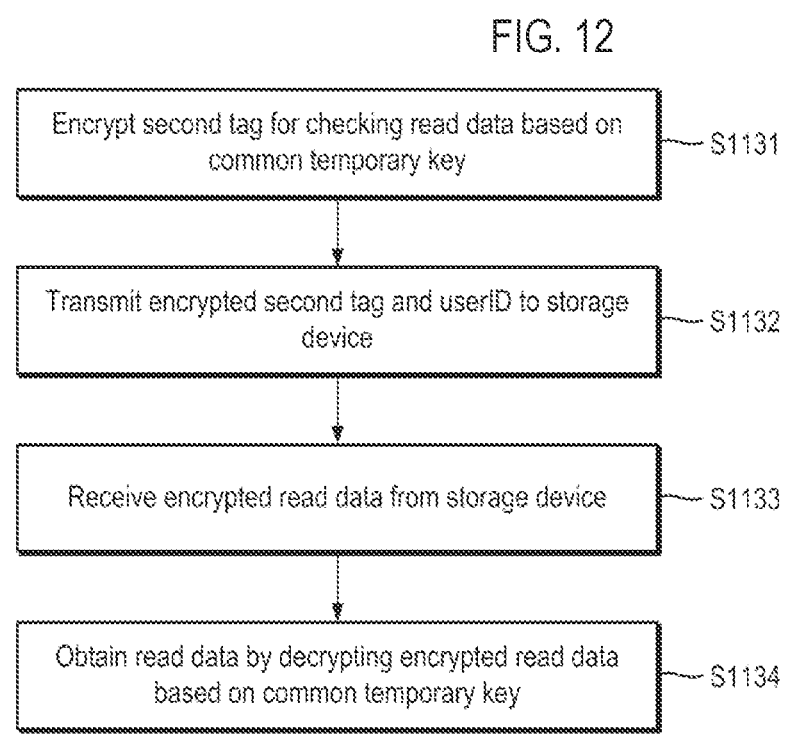

Encrypt second tag for checking read data based on common temporary key — S1131

Transmit encrypted second tag and userID to storage device — S1132

Receive encrypted read data from storage device — S1133

Obtain read data by decrypting encrypted read data based on common temporary key — S1134

ELECTRONIC DEVICE FOR DATA ISOLATION AND METHOD OF OPERATING THE SAME

CROSS-REFERENCE TO RELATED APPLICATION(S)

This U.S. patent application claims priority under 35 U.S.C. § 119 to Korean Patent Application No. 10-2023-0006345, filed on Jan. 16, 2023, in the Korean Intellectual Property Office, the disclosure of which is incorporated by reference in its entirety herein.

1. TECHNICAL FIELD

The present disclosure relates to an electronic device for data isolation and a method of operating the same.

2. DISCUSSION OF RELATED ART

Data security may protect digital data, such as those in a database, from destructive forces and the unwanted actions of unauthorized users. In data security, there is a need to protect data that is in-transit, at-rest, and in-use. Data that is in-transit may include data transmitted from a first device to a second other device or transmitted from one location in the first device to a second other location in the first device. Data that is at-rest may include data that is stored locally. Data that is in-use may include data that is currently being operated on or accessed.

Data security may be increased by using encryption. One computing technology provides services with increased security that rely on an encrypted file. However, these services may become disabled because the encrypted file is deleted.

A secure element (SE) may be provided as an additional storage device for confidential computing. The SE may be a chip that is designed to be protected from unauthorized access and used to run a limited set of applications. However, SEs may lack versatility due to a small storage space and environmental limitations.

SUMMARY

Example embodiments provide an electronic device for data isolation and a method of operating the same.

According to an example embodiment, an electronic device includes a storage device, including a secure area assigned to a trusted application a normal area, and a processor. The processor is configured to generate a user identifier, assigned to the trusted application, based on the trusted application and device information and to manage data requested for the secure area from the trusted application based on the user identifier. The device information may include at least one of information associated with the storage device and information associated with the processor.

According to an example embodiment, an operating method includes generating a user identifier, assigned to a trusted application, based on device information including at least one of information, associated with a storage device including the trusted application and a secure area assigned to the trusted application, and information, associated with a processor in which the trusted application is executed, and managing data requested for the secure area from the trusted application based on the user identifier.

According to an example embodiment, a storage device includes a nonvolatile memory, including a secure area assigned to a trusted application and a normal area, and a storage controller configured to the nonvolatile memory. The storage controller receives a user identifier assigned to the trusted application from a host device and writes or reads data requested for the secure area from the trusted application based on the user identifier. The user identifier is information generated based on device information including at least one of information, associated with the trusted application and the storage device, and information associated with a processor in which the trusted application is executed.

BRIEF DESCRIPTION OF DRAWINGS

The above and other aspects and features of the present disclosure will be more clearly understood from the following detailed description, taken in conjunction with the accompanying drawings.

FIG. 12 is a flowchart illustrating a reading method of a processor according to an example embodiment.

DETAILED DESCRIPTION

Hereinafter, example embodiments will be described with reference to the accompanying drawings.

Figure 1:
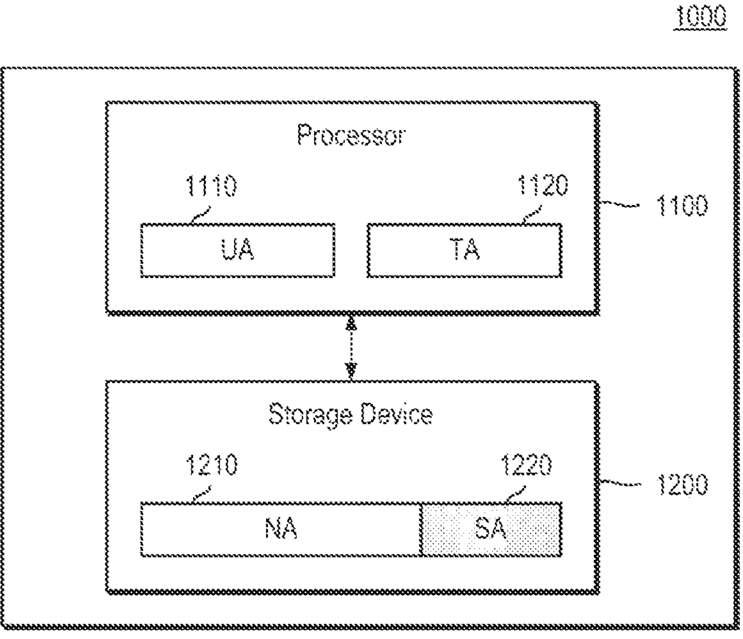
FIG. 1 is a diagram illustrating an electronic device according to an example embodiment.

FIG. 1 is a diagram illustrating an electronic device according to an example embodiment.

Referring to FIG. 1, an electronic device 1000 according to an example embodiment may include a processor 1100 and a storage device 1200.

For example, the electronic device 1000 may be implemented as a server, a data center, a personal computer (PC), a network-attached storage, an Internet of Things (IoT) device, or a portable electronic device. The portable electronic device may be a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, or the like.

The processor 1100 may control the overall operation of the electronic device 1000 and operations of components included in the electronic device 1000, and may perform data processing.

For example, the processor 1100 may include at least one of a central processing unit (CPU), a graphics processing unit (GPU), an application processor (AP), or a communication processor (CP).

In an example embodiment, the processor 1100 supports a trusted execution environment (TEE). The TEE is an environment in a secure area 1220 of the processor 1100 which protects code (e.g., executable code) and data loaded inside the TEE, and may provide confidentiality and integrity. The TEE is an execution environment isolated in terms of hardware. Access to a memory, used inside the TEE, by an external entity may be blocked, and data stored in the TEE may be encrypted. The TEE is isolated and runs in parallel with an operating system in a non-TEE, and is more secure than a user-facing operating system.

The TEE may be referred to as a trusted part (TP) or a secure world, and a non-TEE may be referred to as an untrusted part (UP), a rich world, or a normal world. An application executed in the TEE may be referred to as a trusted application (TA) 1120, and an application executed in the non-TEE may be referred to as an untrusted application (UA) 1110. The TA 1120 is an application executed within the TEE providing security-associated functions to an external client application or another trusted application inside the TEE.

The processor 1100 may run both the TEE and the non-TEE. As necessary, the processor 1100 may switch between operating the TEE and the non-TEE.

The storage device 1200 may be controlled according to the processor 1100. For example, the storage device 1200 may be a solid-state drive (SSD), a universal flash storage (UFS), or an embedded multimedia controller (eMMC). Alternatively, the storage device 1200 may be implemented as a secure digital (SD) card, a micro SD card, a memory stick, a chip card, a universal serial bus (USB) card, a smart card, a compact flash (CF) card, or the like, but example embodiments are not limited thereto.

In an example embodiment, the storage device 1200 may store data requested through the TA 1120 and the UA 1110, respectively running in the TEE and the non-TEE. The storage device 1200 may include a secure area (SA) 1220, assigned to the TA 1120 to store the data requested through the TA 1120. The storage device 1200 may include a normal area (NA) 1210 assigned to the UA 1110 to store the data requested through the UA 1110. Accordingly, the storage device 1200 may independently run the TA 1120 and the UA 1110.

For example, according to an example embodiment, the secure area 1220 assigned to the TA 1120 may be provided independently for each TA 1120 running in the TEE. Data stored in the secure area 1220 may be encrypted, and may be accessed only through the TA 1120.

The secure area (SA) 1220, provided only for the TEE in the storage device 1200, may be managed through the processor 1100.

The processor 1100 may generate a user identifier to manage the secure area 1220. The user identifier may be assigned to each TA 1120. For example, the user identifier is a unique identifier for the TA 1120. The processor 1100 may use device information, information associated with the TA 1120 and the storage device 1200, to generate a unique user identifier for each TA 1120. The device information may be a type of hardware platform information and may have hardware-dependent attributes. For example, the device information may include at least one of information associated with the processor 1100 and information associated with the storage device 1200. In an embodiment, the processor 1100 generates a user identifier based on the TA 1120 or extra information, in addition to the TA 1120 and the device identifier.

The processor 1100 may generate a user identifier based on a hash function. As an example, the hash function may be defined as Hash(TA, DeviceInfo), where TA includes pieces of information associated with a trusted application and DeviceInfo includes at least one of pieces of information associated with the processor 1100 and pieces of information associated with the storage device 1200 (for example, a device identifier, or the like). Alternatively, as an example, the hash function may be defined as Hash(TA, DeviceInfo, extradata), where extradata is additional information associated with the TA 1120 or the storage device 1200, except for TA or DeviceInfo.

For example, TA may include TA header information, and DeviceInfo may include at least one of information associated with the processor 1100 and information associated with the storage device 1200. For example, the information associated with the processor 1100 may include unique information (for example, at least one of a serial number and a manufacturer of the processor) of the processor 1100 providing the TEE to run the TA, and the information associated with the storage device 1200 may include a unique number of the storage device 1200, or the like. For example, extradata may include at least one of version information of software driving the TEE, version information of a platform running the TEE, and driver version information of the processor 1100 or the storage device 1200.

The user identifier is generated through the TA 1120 and device information. This is because data, stored in the corresponding storage device 1200, should not be read through another storage device 1200. In an embodiment of the present disclosure, the user identifier is generated in consideration of the TA 1120 and device information according to the above-described embodiments, so that when the TA 1120 and/or the storage device 1200 are changed, the user identifier may also be changed. When the user identifier is changed, the corresponding user identifier may be considered to be invalid, and thus an access to data linked with the user identifier may be blocked. For example, if a first user identifier was previously generated from a first TA and the device information, and the first TA is later replaced with a second other TA, a second user identifier generated from the second TA and the device information would be considered to be invalid when it differs from the first user identifier. Accordingly, the data may be protected from another TA 1120 or the storage device 1200.

The processor 1100 may generate a user identifier when the TA 1120 is loaded. The processor 1100 may generate a user identifier in consideration of TA information (for example, TA 1120), which is information associated with the loaded TA 1120, and information (for example, DeviceInfo) associated with the storage device 1200 in or from which data is written or read through the corresponding TA 1120.

The processor 1100 may manage data requested for the secure area 1220 from the TA 1120 based on the generated user identifier. In an example embodiment, the processor 1100 manages data, intended to be stored in the secure area 1220 by a specific TA 1120, based on <userID, Tag, data>. The "userID" may be a user identifier, the "Tag" may be information tagged on data to check and manage data requested to be written or read, and the "data" may be written or read data.

The processor 1100 may recognize the TA 1120 based on the user identifier and may recognize data, requested by the corresponding TA 1120, through a tag when the TA 1120 corresponding to the user identifier requests an operation such as reading or writing specific data. The processor 1100 may write data having a tagged tag in the secure area 1220 in the storage device 1200 corresponding to the user identifier, or may recognize data read from the secure area 1200 based on a tag and may read the corresponding data.

According to the above-described embodiments, the normal area 1210 which is a storage space for the UA 1110 running in the non-TEE and the secure area 1220 which is a storage space for the TA may independently run in the storage device 1200. For example, a user identifier allowing the TA 1120 to access the secure area 1220 may be generated to independently run the secure area 1220, and thus the secure area 1220 may be managed. The user identifier may be generated in consideration of both the TA 1120 and the information associated with the storage device 1200 to block access to the corresponding secure area 1220 when the TA 1120 and the storage device 1200 are changed, resulting in increased integrity.

Figure 2:
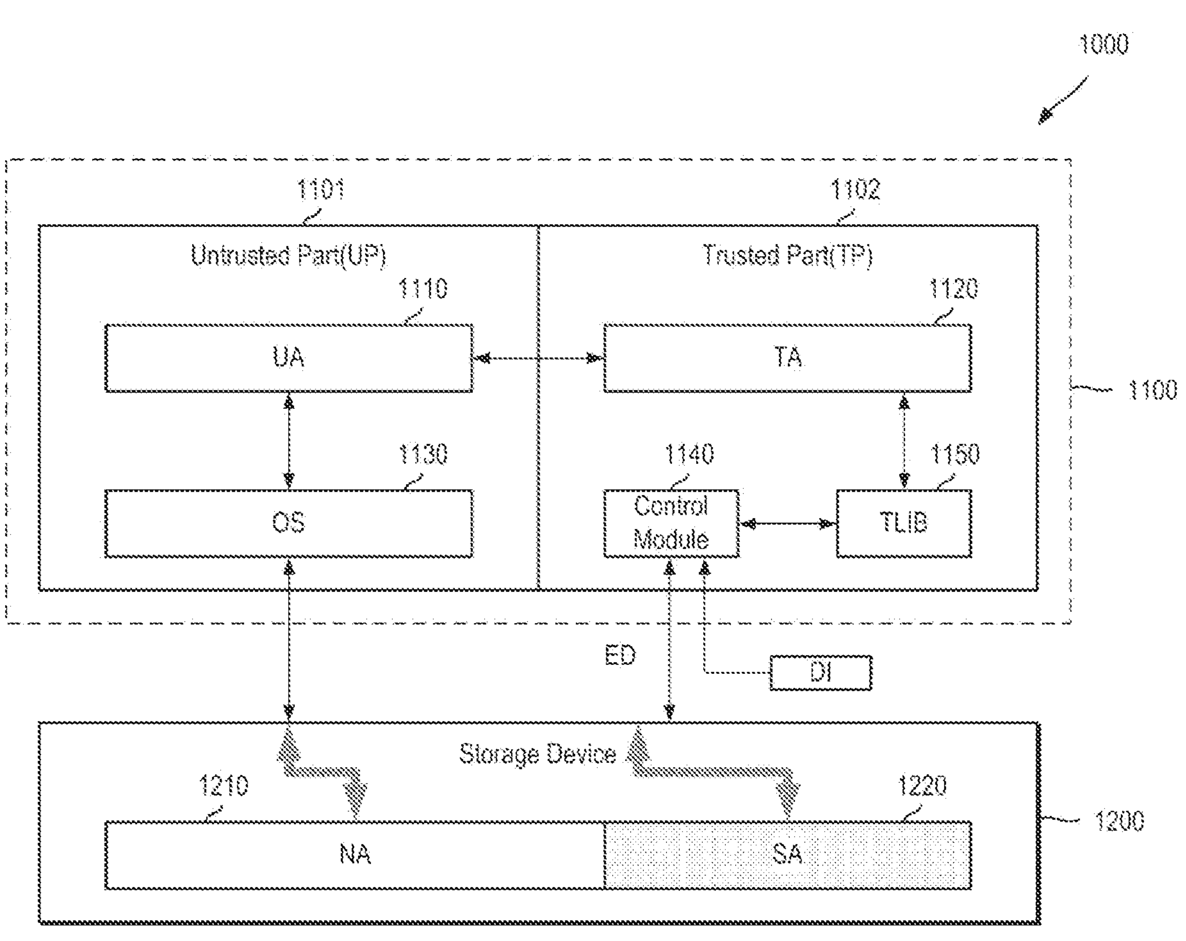
FIG. 2 is a diagram illustrating an electronic device according to an example embodiment in more detail.

FIG. 2 is a diagram illustrating an electronic device according to an example embodiment in more detail.

Referring to FIG. 2, the processor 1100 may independently run a trusted part (hereinafter referred to as "TP") 1102, which a TEE, and an untrusted part (herein after referred to as "UP") 1101, which is a non-TEE, as described above. The processor 1100 may divide and run a virtual core corresponding to the TP 1102 and the UP 1101.

One or more UAs 1110 may operate in the UP 1101. For example, while FIG. 2 illustrates one UA 1110, there may be a plurality of UA 1110. The UP 1101 may be a system environment driven by a normal operating system 1130. The normal operating system 1130 may perform an operation to control hardware and software in the UP 1101. One or more TAs 1120 may operate on the TP 1102. For example, while FIG. 2 illustrates one TA 1120, there may be a plurality of TA 1120. Although not illustrated, the TP 1102 may also be a system environment driven by a secure operating system, an operating system for the TP 1102. In each area, the TA 1120 and the UA 1110 may independently operate.

Important data used through the TA 1120 may be encrypted in the TP 1102 and stored in the storage device 1200, and the TA 1120 may access the encrypted data ED stored in the storage device 1200. In an embodiment, the encrypted data ED is decrypted and used only in the TP 1102. For example, the TP 1102 may decrypt the encrypted data ED into unencrypted data for its own use without sharing the unencrypted data with the UP 1101.

In an example embodiment, the TP 1102 and the UP 1101 process data in the secure area 1220 and the normal area 1210, divided in the storage device 1200, without sharing the storage device 1200. For example, the UP 1101 may be prevented from accessing the secure area 1220. The data ED encrypted in the TP 1102 may be stored in the secure area 1220, and the data used in the UP 1101 may be stored in the normal rea 1210. The TA 1120 may access the secure area 1220 through a user identifier userID.

The processor 1100 may load and execute the UA 1110 or the TA 1120. Data-in-transit is unavoidably performed to process data requested through the TA 1120 in which the processor 1100 is operating in the secure area 1220 in the storage device 1200.

The processor 1100 may perform various operations for data transmission protection. According to an example embodiment, before writing or reading data in or from the data storage device 1200, the processor 1100 performs a secure area authentication to verify whether the secure area 1220 is normal, for example, trustable (or trustworthy), through a certificate, user registration for the storage device 1200, and temporary key exchange for encryption during data transmission and reception.

When the operations for the data transmission protection are completed, the processor 1100 and the storage device 1200 may mutually obtain a common temporary key. The processor 1100 may perform data transmission, such as writing or reading data, with the storage device 1200 based on the obtained common temporary key. The TA 1120 may encrypt written or read data based on the common temporary key to generate encrypted data ED.

The processor 1100 may include a trusted library (TLIB) 1150 and a control module 1140 to independently run the TP 1102.

The trusted library 1150 may provide an application programming interface (API) 1151 for the TP 1102 (e.g., TAPI). The API 1151 may be an interface controlling or managing resources used to execute the TA 1120. The TA 1120 may make a request to write or read data in or from the control module 1140 through the API 1151.

The control module 1140 may control various operations for the TA 1120 to be executed in the TP 1102. In an example embodiment, the control module 1140 generates a user identifier userID based on information associated with the TA 1120 and the storage device 1200. The control module 1140 may independently run and manage the TA 1120 and the secure area 1220 corresponding to the TA 1120 based on the generated user identifier userID. When the TA 1120 is loaded, the control module 1140 may generate a user identifier userID based on the information associated with the TA 1120 and device information DI. For example, the device information DI may correspond to the information associated with the storage device 1200. In an example embodiment, the control module 1140 receives the information associated with the storage device 1200 (e.g., the device information DI) from the storage device 1200 for generation of the user identifier userID. Alternatively, the control module 1140 may utilize device information DI stored in a memory or a buffer linked to the processor 1100.

When the above-described data transmission protection operations are performed, the control module 1140 may relay various pieces of information (e.g., relayed information) including encrypted data ED transmitted between the TA 1120 and the storage device 1200. The control module 1140 may add a user identifier userID to the relayed information to generate modified relayed information and transmit the modified relayed information.

Access to the secure area 1220 through the TA 1120 and the control module 1140 according to the above-described embodiments may be processed independently of the normal operating system 1130 for driving the UP 1101. The UA 1110 may process data by accessing the normal area 1210 in the storage device 1200 while operating in the UP 1101 through the normal operating system 1130. The TA 1120 may directly access the secure area 1220 in the storage device 1200 through the control module 1140 to process data, based on a unique user identifier userID determined from the TA 1120 and the storage device 1200.

According to the above-described embodiments, the normal area 1210 for the UA 1110 and the secure area 1220 for the TA 1120 may be separated from each other in the storage device 1200, and accesses to the respective separated areas may be independently managed. For example, the TA 1120 may access the secure area 1220 without the normal operating system 1130, included in the UP 1101, based on an API 1151 provided through the trusted library 1150 and a user identifier userID generated for each TA 1120. Accordingly, the TEE and the secure domain 1220 may be run without dependency on the UP 1101.

Figure 3:
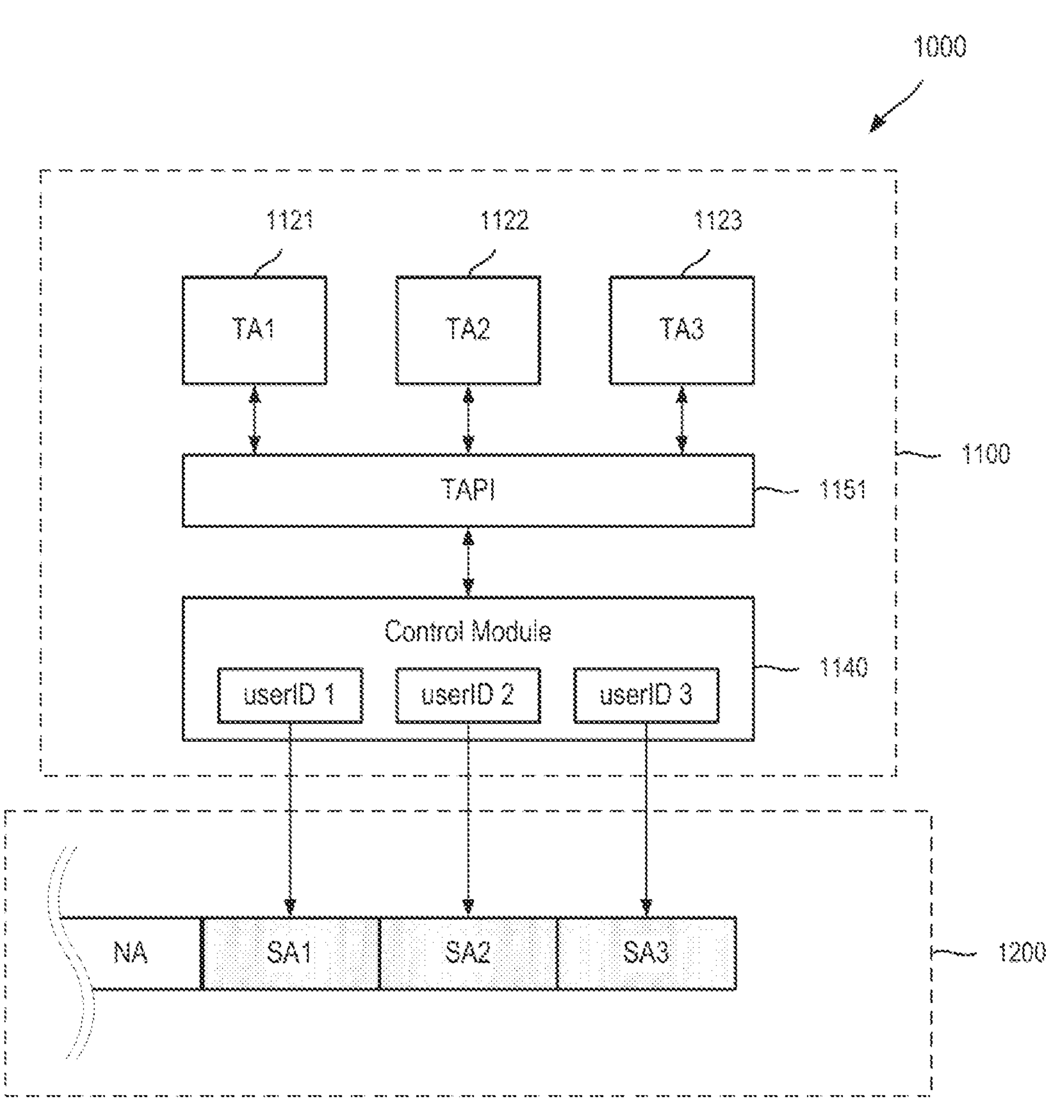
FIG. 3 is a diagram provided to describe a user identifier of an electronic device according to an example embodiment.

FIG. 3 is a diagram provided to describe a user identifier of an electronic device according to an example embodiment.

Referring to FIG. 3, a plurality of TAs 1121 (e.g., TA1), 1122 (e.g., TA2), and 1123 (e.g., TA3) may be executed in a TP 1102 driven through a processor 1100. The plurality of TAs 1121, 1122, and 1123 may request the control module 1140 to write or read data through the API 1151 provided through the trusted library 1150. For example, the TAs 1121, 1122, and 1123 may send a write/read request to the control module 1140 by invoking a write/read function of the API 1151.

The control module 1140 may generate user identifiers userID 1, userID 2, and userID 3 for the respective TAs 1121, 1122, and 1123 requested to process data. For example, the control module 1140 may generate the user identifiers userID 1, userID 2, and userID 3 based on unique TA information of each of the plurality of TAs 1121, 1122, and 1123 and device information DI. For example, the device information DI may be information about the storage device 1200.

The control module 1140 may relay various pieces of data transmitted between the TAs 1121, 1122, and 1123 and the storage device 1200. For example, when the control module 1140 transmits data encrypted by the TAs 1121, 1122, and 1123 to the storage device 1200, the control module 1140 may add and transmit the generated user identifiers userID 1, userID 2, and userID 3 together with the encrypted data. For example, the control module 1140 may append userID 1 to encrypted data from the TA 1121 to generate resulting data for output to the storage device 1200.

The storage device 1200 may process data, requested by a specific TA 1120, in the secure area 1220 corresponding to each of the TAs 1121, 1122, and 1123. For example, the storage device 1200 may store data, requested to be written by TA1 1121, in the SA1 or may read data, requested to be read by TA1 1121, from the SA1. For example, a first portion (e.g., SA1) of the storage device 1200 may be used to store data associated with TA1, a second portion (e.g., SA2) of the storage device 1200 may be used to store data associated with TA2, and a third portion (e.g., SA3) of the storage device 1200 may be used to store data associated with TA3.

Since each of the user identifiers userID 1, userID 2, and userID 3 is generated based on information of the TA 1120 and the device information DI according to the above-described embodiments, access to the secure area 1220 corresponding to the user identifier userID may be blocked when one of the TA 1120 and the storage device 1200 is changed.

Figure 4:
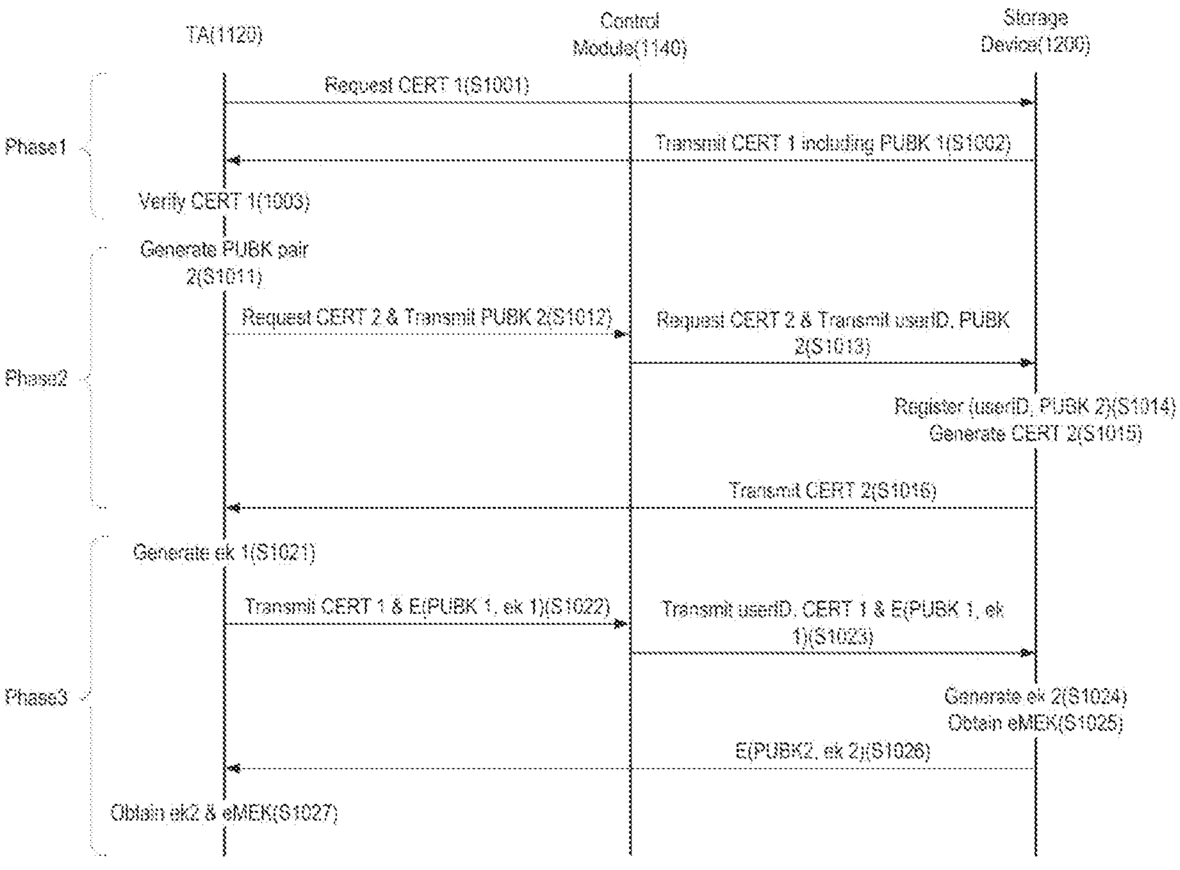
FIG. 4 is a diagram illustrating an operation for data transmission protection of an electronic device according to an example embodiment.

FIG. 4 is a diagram illustrating an operation for data transmission protection of an electronic device according to an example embodiment.

Referring to FIG. 4, the processor 1100 and the storage device 1200 may perform operations for data transmission protection prior to data transmission (writing or reading). Each of the operations may be classified into a first phase to a third phase.

In the first phase (e.g., Phase 1), secure area authentication may be performed on the secure area 1220 in the storage device 1200. The TA 1120 may perform the first phase to verify whether the secure area 1220 is to be trusted, prior to data transmission to the secure area 1220. In operation S1001, the TA 1120 requests a first certificate CERT 1 for authentication of the secure area 1220 from the storage device 1200. The TA 1120 may send a request (e.g., a message) to the storage device 1200 that requests the first certificate CERT 1.

When the storage device 1200 receives the request for the first certificate CERT 1 from the TA 1120, the storage device 1200 transmits the first certificate CERT 1 including a first public key PUBK 1 to the TA 1120 in operation S1002. The first certificate CERT 1 may include information on a certification authority or a signature. The storage device 1200 may generate a first public key pair including the first public key PUBK 1 in response to receiving the request for the first certificate CERT 1, or the first public key PUBK 1 included in the first public key pair may be included in the first certificate CERT 1. The first public key pair may include the first public key PUBK 1 and a second private key.

In operation S1003, in response to receiving the first certificate CERT 1 from the storage device 1200, the TA 1120 may verify whether the received first certificate CERT 1 is valid. For example, the TA 1120 may check validity of the first certificate CERT 1 through an authentication entity such as a certificate authority (CA) located outside of the electronic device 1000 or an authentication network. Accordingly, the TA 1120 may check in advance whether the secure area 1220 to process data is valid, through the first certificate CERT 1.

Operations S1001 to S1003 may be performed in the first phase. The secure area authentication for the secure area 1220 may be completed through the first phase.

When the secure area authentication is completed, user registration for the storage device 1200 may be performed in the second phase.

In operation S1011, the TA 1120 generates a second public key pair PUBK pair 2. The second public key pair PUBK pair 2 may include a second public key PUBK 2 and a second private key.

In operation S1012, the TA 1120 transmits a request for a second certificate CERT 2 and the second public key PUBK 2 to the control module 1140 to request the second certificate CERT 2 to the storage device 1200. Alternatively, the TA 1120 may transmit manifest information on the TA 1120 together with the second public key PUBK 2.

The control module 1140 may receive the request for the second certificate CERT 2 and the second public key PUBK 2 from the TA 1120. In operation S1013, the control module 1140 transmits the request for the second certificate CERT 2 and the second public key PUBK2 to the storage device 1200 after adding the user identifier userID thereto. For example, the control module 1140 may append the user identifier userID to the request to generate resulting data for output to the storage device 1200. The user identifier userID may be generated through the control module 1140 when the corresponding TA 1120 is loaded. Alternatively, the control module 1140 may generate the user identifier userID in response to receiving the request for the second certificate CERT 2.

The storage device 1200 may receive the request for the second certificate CERT 2, the second public key PUBK 2, and the user identifier userID from the control module 1140. In operation S1014, the storage device 1200 may perform user registration. The storage device 1200 may complete user registration for the TA 1120, corresponding to the user identifier userID, based on the user identifier userID and the second public key PUBK 2 received from the control module 1140.

In operation S1015, the storage device 1200 completing the user registration may generate a second certificate CERT2 for the user identifier userID and the second public key PUBK 2. The second certificate CERT 2 may include the second public key PUBK2, information on a certification authority, and/or a signature.

In operation S1016, the storage device 1200 transmits the generated second certificate CERT 2 to the TA 1120. The TA 1120 may complete the user registration in response to receiving the second certificate CERT 2 from the storage device 1200. Also, the TA 1120 may check validity of the second certificate CERT 2 through an external authentication entity or an authentication network, similarly to the first certificate CERT 1.

Operations S1011 to S1016 may be performed in the second phase. The user registration may be completed through the second phase.

When the user registration is completed, a temporary key exchange based on a public key scheme may be performed through a third phase. The temporary key exchange may be performed based on a first public key pair corresponding to the storage device 1200 and a second public key pair PUBK pair 2 corresponding to the TA 1120.

In operation S1021, the TA 1120 may generate a first temporary key ek 1 to be used for data transmission. For example, the TA 1120 may generate the first temporary key ek 1 based on a random key generation scheme. The first temporary key ek 1 may have a one-time property used to encrypt data to be processed in the secure area 1220.

In operation S1022, the TA 1120 may encrypt the first temporary key ek 1 based on the first public key PUBK 1 obtained in the first phase to generate encrypted first temporary key ek 1, and may transmit the encrypted first temporary key ek 1 and the first certificate CERT 1 to the control module 1140.

In operation S1023, the control module 1140 may transmit the user identifier userID, in addition to the first certificate CERT 1 and the encrypted first temporary key ek 1, to the storage device 1200.

In operation S1024, the storage device 1200 receiving the first certificate CERT 1 and the encrypted first temporary key ek 1 may generate a second temporary key ek 2 corresponding to the first temporary key ek 1. For example, the storage device 1200 may generate the second temporary key ek 2 based on the random key generation scheme. Similarly to the first temporary key ek 1, the second temporary key ek 2 may have a one-time property.

In operation S1025, the storage device 1200 may decrypt the received encrypted first temporary key ek 1 based on a first private key corresponding to the first public key PUBK 1 to obtain a first temporary key ek 1. The storage device 1200 may obtain a common temporary key eMEK defined based on the first temporary key ek 1 and the second temporary key ek 2. For example, the storage device 1200 may obtain the common temporary key eMEK through a multiplication operation on the first temporary key ek 1 and the second temporary key ek 2, or may obtain the common temporary key eMEK through various other operations or functions including the first temporary key ek 1 and the second temporary key ek 2.

In operation S1026, the storage device 1200 encrypts the second temporary key ek 2, generated in operation S1024, based on a second public key PUBK 2 received from the TA 1120 to generate an encrypted second public key PUBK 2 and transmits the encrypted second public key PUBK 2 to the TA 1120.

In operation S1027, the TA 1120 may receive the second temporary key ek 2, encrypted with the second public key PUBK 2, from the storage device 1200 and may decrypt the encrypted second temporary key ek 2 to obtain a second temporary key ek 2. Also, the TA 1120 may obtain the common temporary key eMEK based on the obtained second temporary key ek 2 and the previously possessed first temporary key ek 1.

Operations S1021 and S1027 may be performed in the third phase. A temporary key exchange may be completed through the third phase. Accordingly, each of the TA 1120 and the storage device 1200 may obtain the common temporary key eMEK. Then, the TA 1120 and the storage device 1200 is considered to be ready to process data in the secure area 1220. For example, after the common temporary key eMEK is obtained, the TA 1120 may write data to the storage device 1200 and read data from the storage device 1200.

Figure 5:
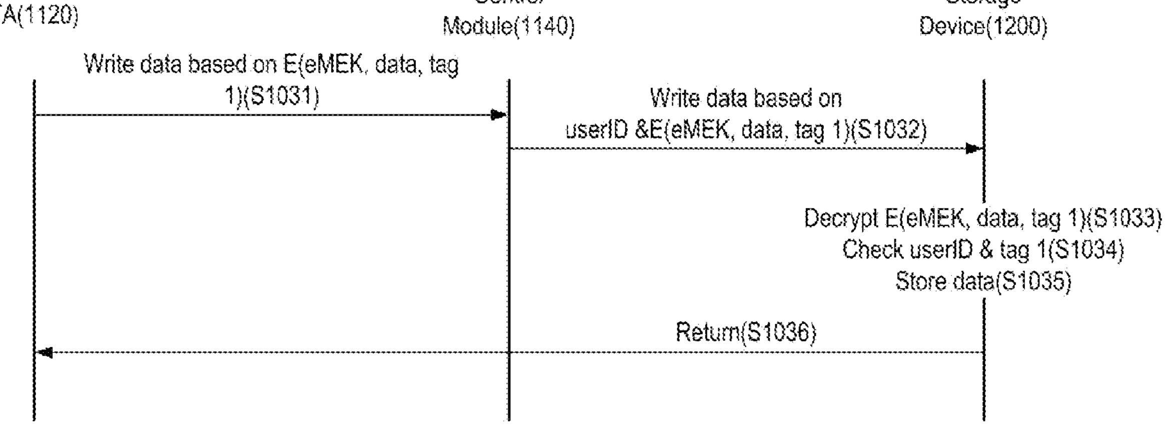
FIG. 5 is a diagram illustrating an embodiment of a data transmission operation of an electronic device according to an example embodiment.

FIG. 5 is a diagram illustrating an embodiment of a data transmission operation of an electronic device according to an example embodiment.

Referring to FIG. 5, the TA 1120 intends to write data in the secure area 1220 in a state in which the TA 1120 and the storage device 1200 obtain the common temporary key eMEK.

In operation S1031, the TA 1120 decrypts write data and a first tag tag 1 for identifying the write data based on the common temporary key eMEK to generate decrypted write data E(eMEK, data, tag 1), and transmits the decrypted write data E(eMEK, data, tag 1) to the control module 1140. The first tag tag 1 may be information tagged on the write data enabling the TA 1120 and the storage device 1200 to identify the data written in the secure area 1220. The TA 1120 may request the control module 1140 to write data using the API 1151 provided through the trusted library 1150.

In operation S1032, the control module 1140 transmits a user identifier userID, in addition to the encrypted write data and first tag E(eMEK, data, tag 1) received from the TA 1120, to the storage device 1200. For example, the control module 1140 may append together eMEK, data, and tag 1 to generate resulting data for output to the storage device 1200.

In operation S1033, the storage device 1200 receives the encrypted write data and first tag E(eMEK, data, tag 1) and the user identifier userID from the control module 1140, and decrypts the encrypted write data and first tag E(eMEK, data, tag 1) based on the common temporary key eMEK possessed by the storage device 1200.

In operation S1034, the storage device 1200 checks the received user identifier userID to identify a secure area 1220 in which data is to be written. Also, the storage device 1200 may check the first tag tag 1 to check whether the first tag overlaps a previously written tag.

In operation S1035, the storage device 1200 may store the write data in the secure area 1220 identified through the user identifier userID, to correspond to the first tag tag 1.

In operation S1036, the storage device 1200 may transmit a return signal to the TA 1120, notifying that data has been written in the secure area 1220.

Figure 6:
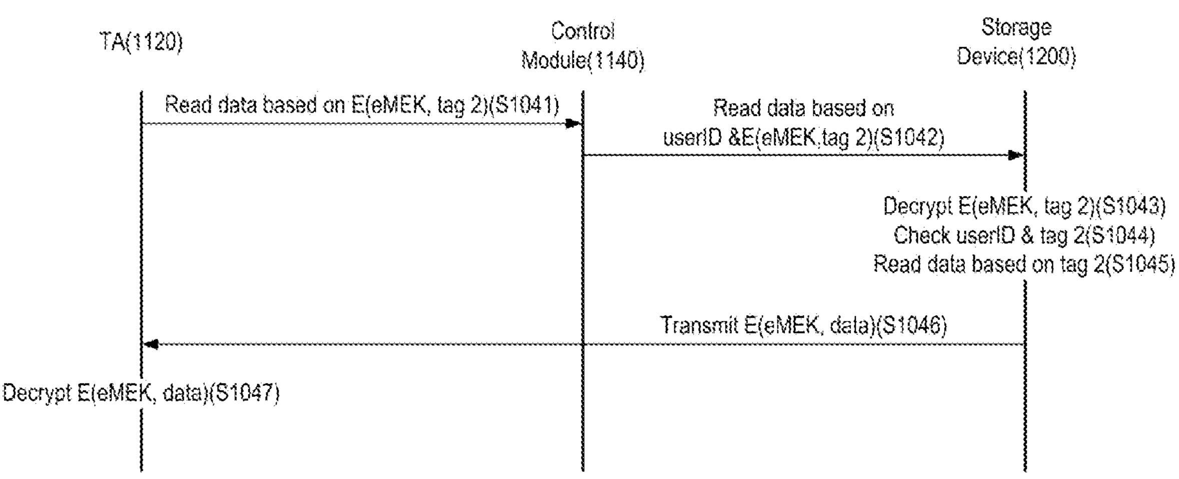
FIG. 6 is a diagram illustrating another embodiment of a data transmission operation of an electronic device according to an example embodiment.

FIG. 6 is a diagram illustrating an embodiment of a data transmission operation of an electronic device according to an example embodiment.

Referring to FIG. 6, the TA 1120 may intend to read the data, written in the secure area 1220, in a state in which the TA 1120 and the storage device 1200 obtain the common temporary key eMEK.

In operation S1041, the TA 1120 may encrypt a second tag tag 2 for identifying the read data based on the common temporary key eMEK to generate an encrypted second tag E(eMEK, tag 2), and may transmit the encrypted second tag E(eMEK, tag 2) to the control module 1140. The second tag (tag 2) may be information tagged on data to read previously written data. The TA 1120 may request the control module 1140 to read the data using the API 1151 provided through the trusted library 1150.

In operation S1042, the control module 1140 transmits a user identifier userID, in addition to the encrypted second tag E(eMEK, tag 2), to the storage device 1200. For example, the control module 1140 may append together the user identifier userID and the encrypted second tag E(eMEK, tag 2) to generate resulting data for output to the storage device 1200.

In operation S1043, the storage device 1200 receives the encrypted second tag E(eMEK, tag 2) and the user identifier userID from the control module 1140, and decrypts the encrypted second tag E(eMEK, tag 2) based on the common temporary key eMEK possessed by the storage device 1200.

In operation S1044, the storage device 1200 checks the received user identifier userID to identify the secure area 1220 from which data is to be read. Also, the storage device 1200 may check the second tag tag 2 to identify the data to be read.

In operation S1045, the storage device 1200 reads data corresponding to the second tag tag 2 from the secure area 1220. Also, the storage device 1200 may encrypt the read data corresponding to the second tag tag 2 based on the common temporary key eMEK to generate encrypted read data E(eMEK, data).

In operation S1046, the storage device 1200 transmits the encrypted read data E(eMEK, data) to the TA 1120.

In operation S1047, the TA 1120 decrypts the encrypted read data E(eMEK, data) based on the common temporary key eMEK, possessed by the TA 1120, to obtain read data.

According to the above-described embodiments, the electronic apparatus 1000 may write or read data in or from the secure area 1220 without any interaction with the normal operating system 1130 for a non-TEE operation when operating in the TEE, and thus may remove dependency on the normal operating system 1130. In addition, data to be transmitted to the secure area 1220 or read data is encrypted, so that the data may be protected even when a hacker intrudes during a data transmission.

Figure 7:
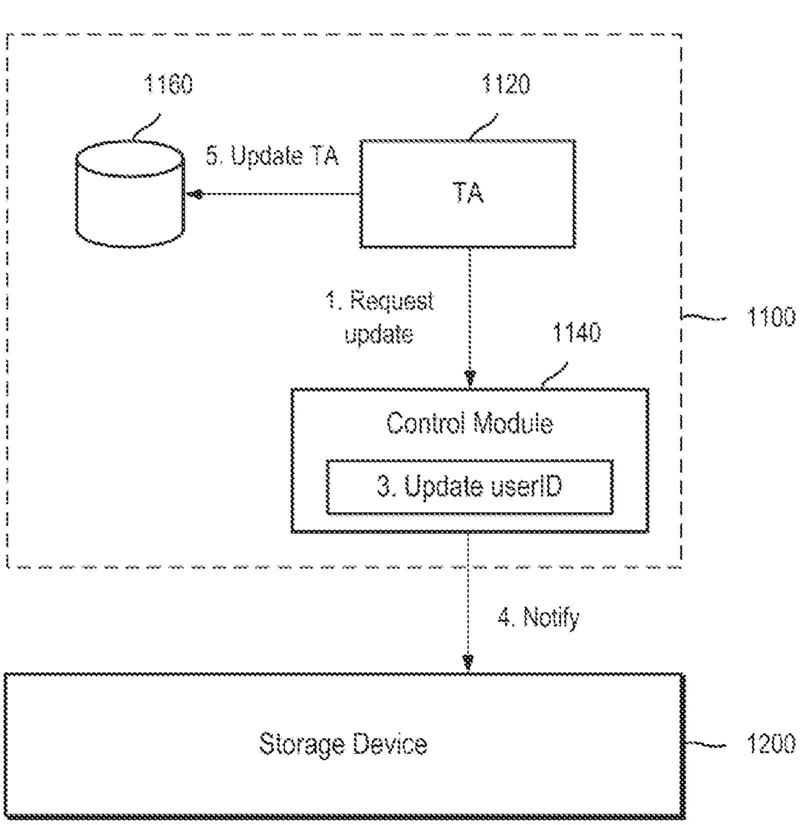
FIG. 7 is a diagram illustrating a trusted application (TA) update operation of an electronic device according to an example embodiment.

FIG. 7 is a diagram illustrating a TA update operation of an electronic device according to an example embodiment.

Referring to FIG. 7, the TA 1120 may be updated when the electronic device 1000 operates in the TP 1102. The update of the TA 1120 may be defined as an operation in which a persistent storage of a TEE is authorized to download a new version of the TA 1120 while maintaining data of a previous version. For example, after the new version is downloaded, and tested successfully, the previous version may be deleted to save space.

When the TA 1120 is updated, the TA 1120 may request the control module 1140 to update a user identifier userID. The control module 1140 may update the user identifier userID to correspond to the TA 1120 to be updated when receiving the request for update. The control module 1140 may notify the storage device 1200 of the updated user identifier userID. Then, the storage node 1200 may also update the user identifier userID. As an example, the storage device 1200 may update a user identifier userID, in which a user is registered through the above-described second phase, to correspond to the TA 1120 to be updated. For example, prior to the update, the storage device 1200 may have a first user identifier associated with the TA 1120, generate a second user identifier based on the updated TA 1120, and replace the first user identifier with the second user identifier.

The TA 1120 may finally update a trusted application to the persistent storage 1160 when an operation of updating an existing user identifier userID to correspond to the TA 1120 to be updated is completed. For example, according to an example embodiment, update of the user identifier userID may be prioritized during the update of the TA 1120.

Figure 8:
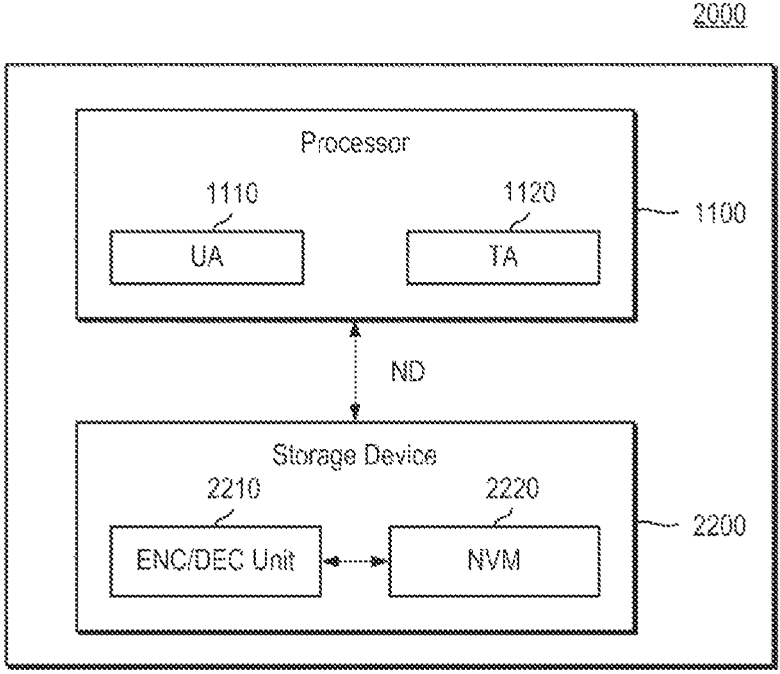
FIG. 8 is a diagram illustrating a self-encryption operation of an electronic device according to an example embodiment.

FIG. 8 is a diagram illustrating a self-encryption operation of an electronic device according to an example embodiment.

Referring to FIG. 8, in an example embodiment, the storage device 2200 included in the electronic device 2000 may be a self-encrypting drive (SED) supporting self-encryption. The storage device 2200 may include an internal encryption (ENC)/decryption (DEC) unit. When the self-encryption is supported, the UA 1110 or TA 1120 may transmit unencrypted data, for example, normal data ND, to the storage device 2200 according to example embodiments.

The ENC/DEC unit 2210 (e.g., a logic circuit or a program executable by the processor 1100) may encrypt the normal data ND, received from the processor 1100 through the UA 1110 or TA 1120, using encryption information.

For example, the encryption information may include various pieces of information used for encryption, such as a password or a personal identification number (PIN). For example, the encryption information may be information input from a user through the UA 1110 or the TA 1120. When the encryption information is input from a user, the ENC/DEC unit 2210 may generate an encryption key using hardware information (for example, device information (DI), or the like) and encryption information. The ENC/DEC unit 2210 may encrypt the normal data ND based on the generated encryption key to generate encrypted data ED.

The encrypted data ED may be stored in a nonvolatile memory (NVM) 2200 in the storage device 2200 connected to the ENC/DEC unit 2210.

When a self-encrypting function for data is supported, the storage device 2200 may use a user identifier userID generated according to the above-described embodiments as encryption information used for the self-encrypting function. In an embodiment, the ENC/DEC unit 2210 encrypts the normal data ND based on the user identifier userID received from the processor 1100 without using additional encryption information from the user.

Figure 9:
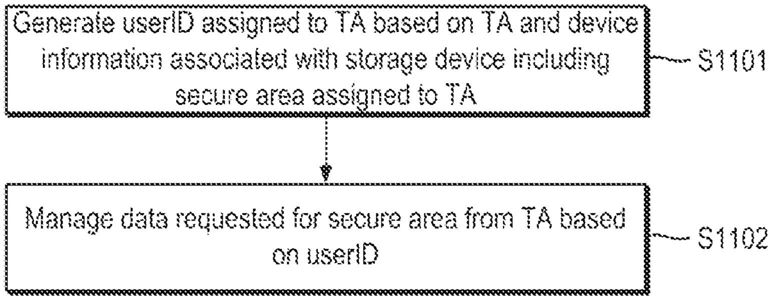
FIG. 9 is a flowchart illustrating a method of operating a processor according to an example embodiment.

FIG. 9 is a flowchart illustrating a method of operating a processor according to an example embodiment.

Referring to FIG. 9, in operation S1101, the processor 1100 generates a user identifier userID, assigned to the TA 1120, based on the TA 1120 and the device information DI. For example, the processor 1100 may generate the user identifier userID when the TA 1120 is loaded.

In operation S1102, the processor 1100 manages data requested for the secure area 1220 from the TA 1120 based on the generated user identifier userID. For example, the processor 1100 may manage data to be stored in the secure area 1220 by a specific TA 1120 based on at least one of a user identifier userID, a tag, and data. The processor 1100 may identify a secure area 1220 corresponding to the specific TA 1120 through the user identifier userID, and may identify written or read data through the tag.

Figure 10:
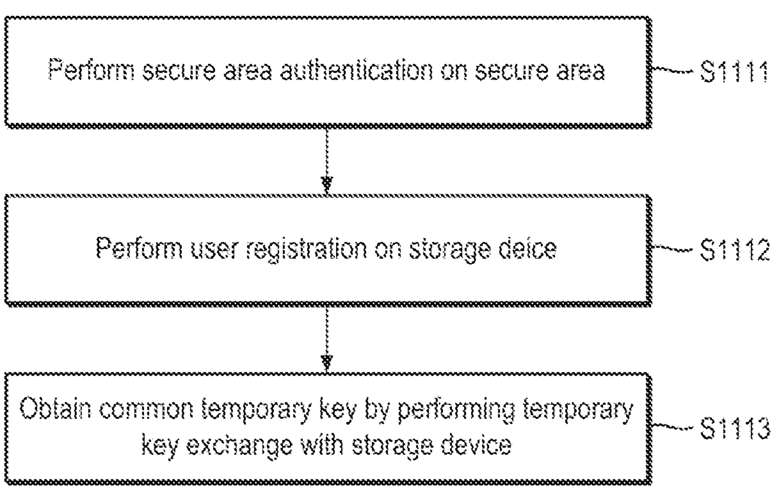
FIG. 10 is a flowchart illustrating a method of operating a processor according to an example embodiment.

FIG. 10 is a flowchart illustrating a method of operating a processor according to an example embodiment.

Referring to FIG. 10, in operation S1111, the processor 1100 performs a secure area authentication on the secure area 1220. For example, the processor 1100 may send a first request to the storage device 1200 to request a first certificate CERT 1 for authentication of the secure area 1220. The processor 1100 may receive the first certificate CERT 1 from the storage device 1200. In an embodiment, the first certificate CERT 1 includes a first public key PUBK 1 included in a first public key pair. The processor 1100 may confirm validity of the first authenticate CERT 1 through an external authentication entity, or the like, and may complete the secure area authentication when the validity is confirmed.

In operation S1112, the processor 1100 performs a user registration on the storage device 1200. For example, the processor 1100 may generate a second public key pair PUBK pair 2 including a second public key PUBK 2 and a second private key. The processor 1100 may send a second request to the storage device 1200 to request a second certificate CERT 2 for the second public key PUBK 2 and a user identifier userID. The processor 1100 may receive the second certificate CERT 2 from the storage device 1200. The processor 1100 may confirm validity of the second certificate CERT 2 through an external authentication entity, or the like, and may complete the user registration when the validity is confirmed.

In operation S1113, the processor 1100 performs a temporary key exchange with the storage device 1200 to obtain a common temporary key eMEK. For example, the processor 1100 may generate a first temporary key ek 1. The processor 1100 may encrypt the first temporary key ek 1 with the first public key PUBK 1 to generate an encrypted first temporary key ek 1 and transmit the encrypted first temporary key ek 1 to the storage device 1200. The encrypted first temporary key ek 1 may be transmitted together with a user identifier userID. The processor 1100 may receive a second temporary key ek 2, encrypted with a second public key PUBK 2, from the storage device 1200. The processor 1100 may decrypt the encrypted second temporary key ek 2 to obtain the second temporary key ek 2, and may obtain a common temporary key eMEK based on the first temporary key ek 1 and the second temporary key ek 2.

Figure 11:
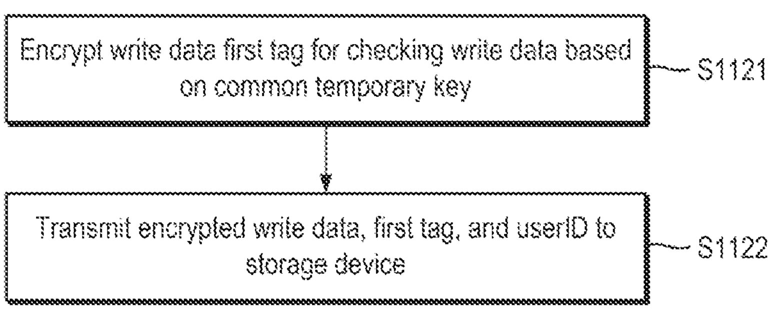
FIG. 11 is a flowchart illustrating a writing method of a processor according to an example embodiment.

FIG. 11 is a flowchart illustrating a writing method of a processor according to an example embodiment.

Referring to FIG. 11, in operation S1121, the processor 1100 encrypts write data and a first tag tag 1 for identifying the write data, based on a common temporary key eMEK.

In operation S1122, the processor 1100 transmits a user identifier userID, together with the encrypted write data and the encrypted first tag tag 1, to the storage device 1200. The user identifier userID may also be encrypted. The storage device 1200 may identically possess the common temporary key eMEK, possessed by the processor 1100, through a temporary key exchange. Accordingly, the storage device 1200 may decrypt the encrypted write data and the encrypted first tag tag 1 with the common temporary key eMEK to obtain write data and may store the obtained write data, together with the first tag tag 1, in the secure area 1220.

FIG. 12 is a flowchart illustrating a reading method of a processor according to an example embodiment.

Referring to FIG. 12, in operation S1131, the processor 1100 encrypts a second tag tag 2 for identifying read data, based on a common temporary key eMEK.

In operation S1132, the processor 1100 transmits a user identifier userID, together with the encrypted second tag tag 2, to the storage device 1200. The user identifier userID may also be encrypted.

In operation S1133, the processor 1100 receives the encrypted read data from the storage device 1200. For example, the processor 1100 may read the encrypted read data from the storage device using the second tag tag 2.

In operation S1134, the processor 1100 may decrypt the encrypted read data based on the common temporary key eMEK to obtain read data (e.g., unencrypted or decrypted read data). The processor 1100 may identically possess the common temporary key eMEK, possessed by the storage device 1200, through temporary key exchange. Accordingly, the processor 1100 may decrypt the encrypted read data using the common temporary key eMEK to obtain the read data.

Figure 13:
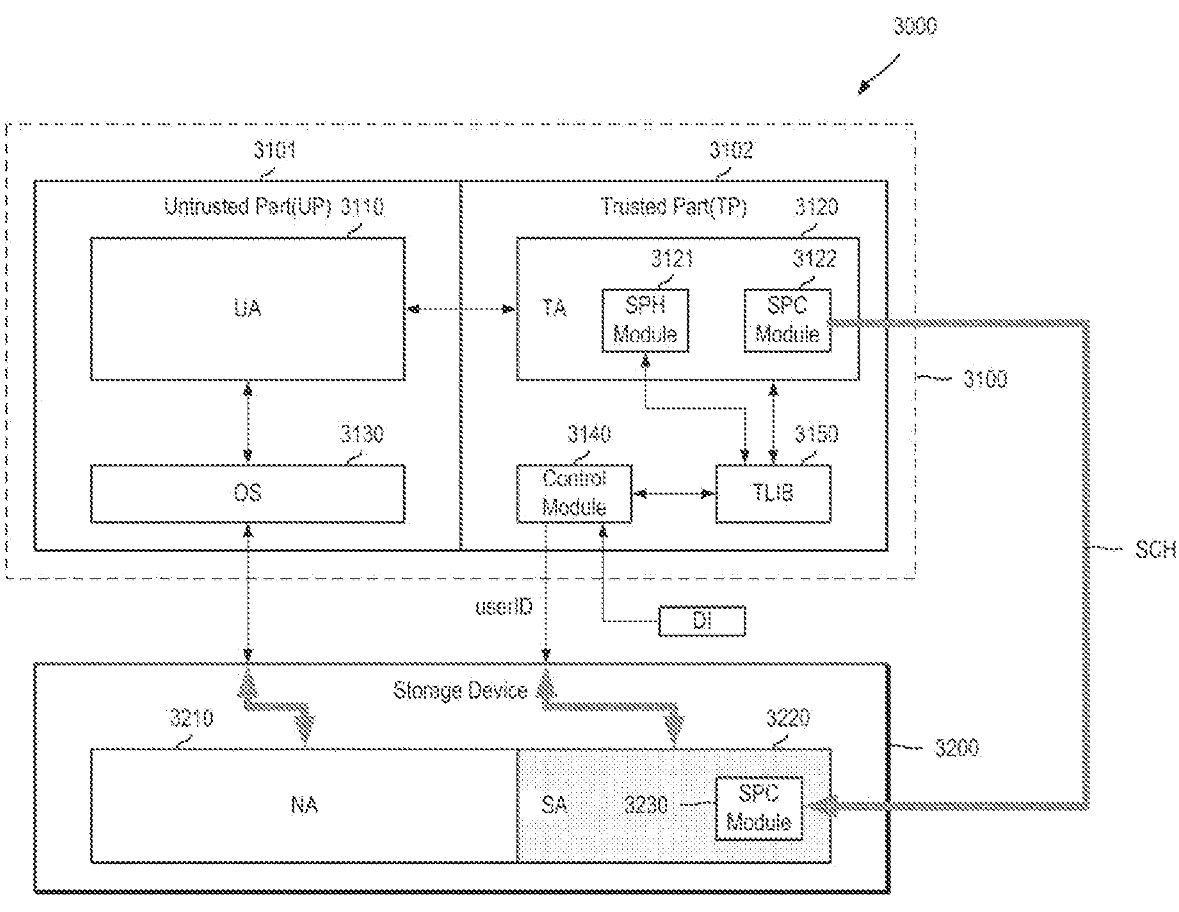
FIG. 13 is a diagram illustrating an electronic device according to an example embodiment.

FIG. 13 is a diagram illustrating an electronic device according to an example embodiment.

Referring to FIG. 13, in an electronic device 3000 according to an example embodiment, a TA 3120 operation in a TP 3102 may include a service program host (SPH) module 3121 and a service program client (SPC) module 3122. The SPH module 3121 is a module driven by a host, and the SPC module 3122 is a module driven by a client.

The SPH module 3121 may provide a service associated with the host. For example, the SPH module 3121 may perform various operations for data transmission protection according to the above-described embodiments through an API 1151 provided through a trusted library 1150 and an operation of writing or reading data in or from a secure area 1220 in a storage device 1200 based on a common temporary key eMEK obtained through an operation providing data protection.

The SPC module 3122 may provide a service associated with the client. In an example embodiment, the TA 3120 downloads the SPC module 3122 to a secure area 3220 in a storage device 3200. For example, the TA 3120 may separate and provide the SPC module 3122 as the secure area 3220 through a plug-in loading function.

The SPC module 3122 provided in the secure area 3220 may be provided to form a trusted channel SCH between the TA 3120 and the storage device 3200. Then, the TA 3120 may process data to be stored in the secure area 3220 to generate processed data and may transmit the processed data to the SPC module 3122. The SPC module 3122 may perform various operations such as an operation of encrypting transmitted data, an operation of adding data, or the like. The SPC module 3122 may store finally generated data in the secure area 3220.

In an example embodiment, the above-described operation for data transmission protection may be performed between the TA 3120, the SPH module 3121, the SPC module 3122, and the secure area 3220 operating through the electronic device 3000. For example, the TA 3120 may perform a secure area authentication on the storage device 3200 and the secure area 3220 through the SPH module 3121, may perform user registration on the storage device 3200, or may perform a temporary key exchange with the storage device 3200 to obtain a common temporary key eMEK.

In an example embodiment, the TA 3120 and the SPH module 3121 perform an operation of writing or reading data in or from the secure area 3220 in the storage device 3200.

In an example embodiment, the control module 3140 may relay information (e.g., relayed data) between the TA 3120, and the SPH module 3121 and the SPC module 3122. The control module 3140 may generate a user identifier userID used for authentication. The control module 3140 may generate a user identifier userID based on a hash function of the processor 3100.

For example, the hash function may be defined as Hash (SP, DeviceInfo), where SP is information associated with at least one of the SPH module 3121 and the SPC module 3122, and DeviceInfo is device information DI. Alternatively, as an example, the hash function may be defined as Hash(SP, DeviceInfo, extradata), where extradata is additional information associated with the TA 3120 or the storage device 3200, except for the SPH module 3121 and the SPC module 3122 or DeviceInfo. The control module 3140 may add the generated user identifier userID to the relayed data, and may transmit a result of the addition to the storage device 3200.

According to the above-described embodiments, the SPC module 3122 included in the TA 3120 may be separated and provided as the secure area 3220 for managing data security. Accordingly, even when the UA 3110 or the TA 3120 is updated, the same service program may be continuously used and version management may be conveniently performed. A manufacturer of the storage device 3200 may provide an additional service for use in the secure area 3220.

Figure 14:
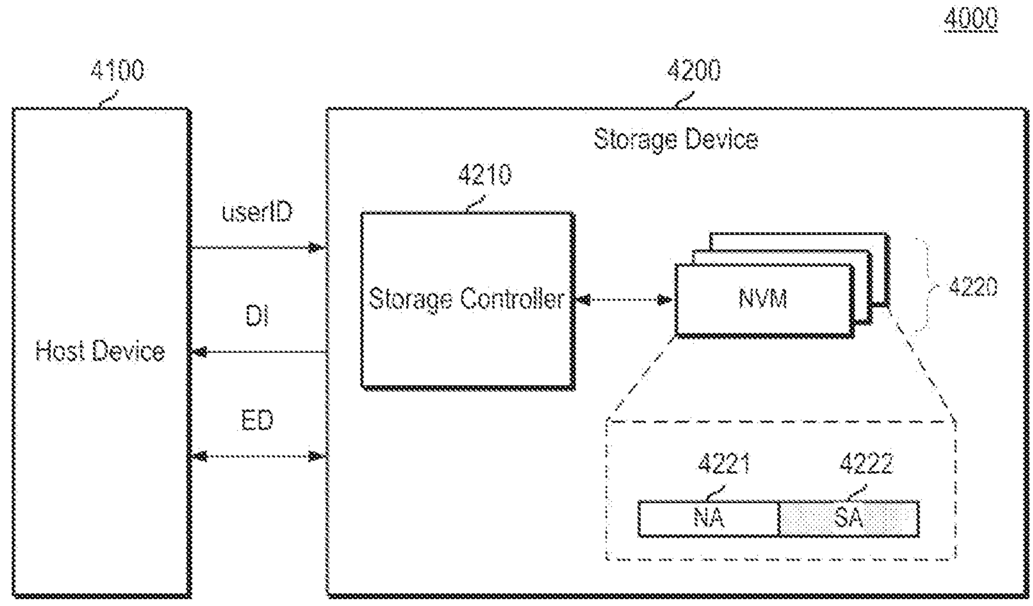
FIG. 14 is a diagram illustrating a storage system according to an example embodiment.

FIG. 14 is a diagram illustrating a storage system according to an example embodiment.

Referring to FIG. 14, a storage system 4000 may include a host device 4100 and a storage device 4200.

The host device 4100 may be connected to the storage device 4200, and may operate in a TEE or a non-TEE according to the above-described embodiments. When operating as a TEE, the host device 4100 may generate a user identifier userID based on device information DI and a TA executed in the TEE. In an example embodiment, the host device 4100 receives information from the storage device 1200, associated with the storage device 4200, in device information for generating a user identifier userID. Alternatively, the host device 4100 may utilize device information DI stored in a memory or a buffer linked to a processor of the host device 4100. The host device 4100 may provide the generated user identifier userID and encrypted data ED to the storage device 4200.

The storage device 4200 may include a storage controller 4210 and a nonvolatile memory 4220.

In an example embodiment, the storage device 4200 may be SSD, UFS, or eMMC. Alternatively, in an example embodiment, the storage device 4200 may be a secure digital (SD) card, a micro SD card, a memory stick, a chip card, a universal serial bus (USB) card, or a smart card, a compact flash (CF) card, or the like, but example embodiments are not limited thereto.

In an example embodiment, the storage device 4200 may be implemented as 3.5 inch, 2.5 inch, 1.8 inch, M.2, U.2, U.3, enterprise and data center SSD form factor (EDSFF), new form factor 1 (NF1), and/or a form factor similar thereto.

In an example embodiment, the storage device 4200 may be implemented as a small computer system interface (SATA), a small computer system interface (SCSI), a serial attached SCSI (SAS), and/or an interface similar thereto, and may be implemented as a peripheral component interconnect (PCI), PCI express (PCIe), nonvolatile memory express (NVMe), NVMe-over-Fabrics (NVMe-oF), Ethernet, InfiniBand, Fiber Channel, and/or a protocol similar thereto.

The storage controller 4210 may be connected to the nonvolatile memory 4220 to control the overall operation of the storage device 4200 including the nonvolatile memory 4220.

The nonvolatile memory 4220 may be controlled by the storage controller 4210. The nonvolatile memory 4220 may store data transmitted from the host device 4100, data generated by the storage device 4200, or other various pieces of data written by the storage controller 4210. In an example embodiment, the nonvolatile memory 4220 be any nonvolatile memory 4220 such as a NAND flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like, but example embodiments are not limited thereto.

The nonvolatile memory 4220 may include a normal area 4221, in which data requested through a UA is stored, and a secure area in which data requested through a TA is stored.

In an embodiment, the storage controller 4210 may receive a user identifier userID, assigned to the TA, from the host device 4100 and may write or read data requested for the secure area 4222 from the TA based on the user identifier userID. The identifier userID may be information generated based on device information DI associated with a processor included in the TA and the host device 4100 or the storage device 4200.

In an example embodiment, the storage controller 4210 writes data requested from the host device 4100. For example, the storage controller 4210 may receive encrypted write data, a first tag, and a user identifier userID from the host device 4100, and may decrypt the encrypted write data and the first tag based on a common temporary key obtained through temporary key exchange with the host device 4100. The storage controller 4210 may store the write data, obtained through decryption, in the secure area 4222 corresponding to the user identifier userID and in a location of the secure area 4222 corresponding to the first tag.

In an example embodiment, the storage controller 4210 reads data requested by the host device 4100. For example, the storage controller 4210 may receive an encrypted second tag and the user identifier userID from the host device 4100, and may decrypt the encrypted second tag based on the common temporary key obtained through temporary key exchange with the host device 4100. The storage controller 4210 may read data, corresponding to the second tag obtained through decryption, from the secure area 4222 corresponding to the user ID userID. The storage controller 4210 may encrypt the read data to generate encrypted read data and transmit the encrypted read data to the host device 4100.

Figure 15:
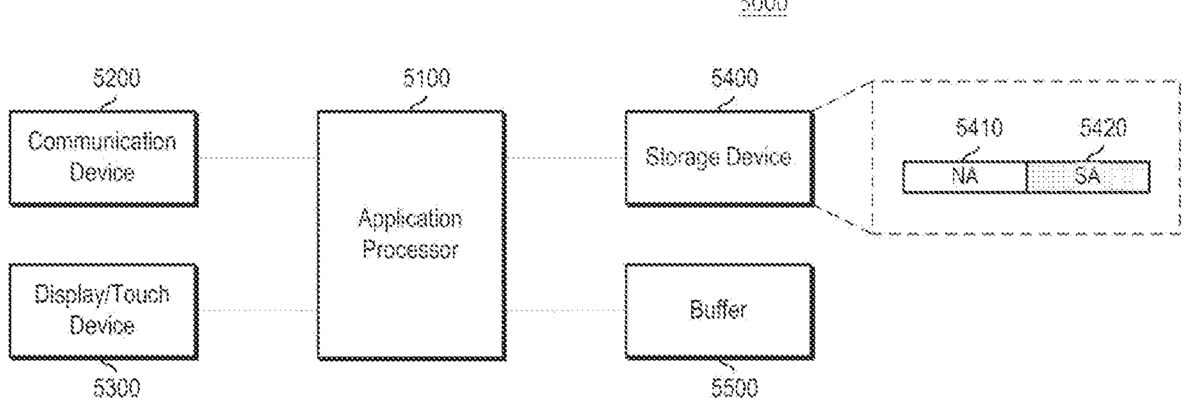
FIG. 15 is a diagram illustrating a mobile device according to an example embodiment.

FIG. 15 is a diagram illustrating a mobile device according to an example embodiment.

Referring to FIG. 15, a mobile device 5000 according to an example embodiment may include an application processor 5100, a communication device 5200, a display/touch device 5300, a storage device 5400, and a buffer 5500.

The application processor 5100 may control the overall operation of the mobile device 5000. The application processor 5100 may execute applications providing Internet browsers, games, videos, or the like. The application processor 5100 may execute one or more UAs and one or more TAs described above. The communication device 5200 may be implemented to control wired communications and/or wireless communications with an external entity. For example, the communication device 5200 may be implemented using a transceiver. The display/touch device 5300 may be implemented to display data processed by an application processor or to receive data from a touch panel. The storage device 5400 may be implemented to store user data.

According to various embodiments, the storage device 5400 may store data requested through TAs and UAs, respectively operating in a TEE and a non-TEE. For example, the storage device 5400 may include a secure area 5420, assigned to the TA to store data requested through the TA, and a normal area 5410 assigned to the UA to store data requested through the UA. Accordingly, the storage device 5400 may be run while being divided into the TA and the NA.

The buffer 5500 may be implemented to temporarily store data used during a processing operation of the mobile device 5000. For example, the buffer 5500 may be dynamic random access memory such as a DDR SDRAM, an LPDDR SDRAM, a GDDR SDRAM, an RDRAM, or the like.

As described above, an electronic device providing a unique storage space for each application without dependency on an operating system in a trusted execution environment and a method of operating the electronic device may be provided.

While various example embodiments have been shown and described above, it will be apparent to those skilled in the art that modifications and variations could be made without departing from the scope of the present inventive concept as defined by the appended claims.

What is claimed is:

1. An electronic device comprising:

a storage device including a secure area assigned to a trusted application and a normal area; and a processor configured to generate a user identifier, assigned to the trusted application, based on the trusted application and device information and to manage data requested for the secure area from the trusted application based on the user identifier, wherein the device information includes at least one of information associated with the storage device and information associated with the processor, and comprises hardware-dependent attributes including hardware platform information, and wherein the processor identifies, based on the user identifier generated using the trusted application and the device information, a portion of the secure area corresponding to the trusted application.

2. The electronic device of claim 1, wherein the processor is configured to:

perform a secure area authentication on the secure area;

perform user registration on the storage device when the secure area authentication is completed; and perform a temporary key exchange with the storage device to obtain a common temporary key when the user registration is completed.

3. The electronic device of claim 2, wherein the processor performs the temporary key exchange with the storage device based on a first public key pair corresponding to the storage device and a second public key pair corresponding to the trusted application.

4. The electronic device of claim 3, wherein the processor requests a first certificate from the storage device for authentication of the secure area, and completes the secure area authentication when receiving the first certificate from the storage device, and the first certificate includes a first public key included in the first public key pair.

5. The electronic device of claim 3, wherein the processor generates the second public key pair, requests a second public key included in the second public key pair and a second certificate for the user identifier from the storage device, and completes the user registration when receiving the second certificate from the storage device, and the second certificate includes the second public key.

6. The electronic device of claim 3, wherein the processor generates a first temporary key, encrypts the first temporary key with the first public key to generate an encrypted first temporary key for transmission to the storage device, receives a second temporary key encrypted with the second public key from the storage device, decrypts the encrypted second temporary key to obtain the second temporary key, and obtains the common temporary key based on the first temporary key and the second temporary key.

7. The electronic device of claim 2, wherein the processor encrypts write data and a first tag for identifying the write data based on the common temporary key to generate encrypted write data, and transmits the encrypted write data and the encrypted first tag and the user identifier to the storage device.

8. The electronic device of claim 7, wherein the storage device decrypts the encrypted write data and the encrypted first tag based on the common temporary key, and stores the write data to correspond to the first tag.

9. The electronic device of claim 2, wherein the processor encrypts a second tag for identifying read data based on the common temporary key to generate an encrypted second tag, transmits the encrypted second tag and the user identifier to the storage device, receives encrypted read data from the storage device, and decrypts the encrypted read data based on the common temporary key to obtain the read data.

10. The electronic device of claim 9, wherein the storage device decrypts the encrypted second tag based on the common temporary key, encrypts read data corresponding to the second tag to generate the encrypted read data, and transmits the encrypted read data to the processor.

11. The electronic device of claim 1, wherein the processor generates the user identifier based on a hash function for the trusted application and the device information.

12. The electronic device of claim 1, wherein the processor updates the user identifier to correspond to a trusted application to be updated when the trusted application is updated to generate an updated user identifier, notifies the storage device of the updated user identifier, and updates the trusted application.

13. The electronic device of claim 1, wherein the storage device uses the user identifier as encryption information of a self-encrypting function when the self-encrypting function for the data is supported.

14. An operating method comprising:

generating a user identifier, assigned to a trusted application, based on the trusted application and device information including at least one of information, associated with a storage device including the trusted application and a secure area assigned to the trusted application, and information associated with a processor in which the trusted application is executed, wherein the device information comprises hardware-dependent attributes including hardware platform information; and managing data requested for the secure area from the trusted application based on the user identifier, and identifying, based on the user identifier generated using the trusted application and the device information, a portion of the secure area corresponding to the trusted application.

15. The operating method of claim 14, further comprising:

performing a secure area authentication on the secure area to determine whether the secure area is trustworthy;

performing a user registration on the storage device when the secure area is determined to be trustworthy; and performing temporary key exchange with the storage device to obtain a common temporary key after completing the user registration.

16. The operating method of claim 15, further comprising:

encrypting write data and a first tag for identifying the write data based on the common temporary key; and transmitting the encrypted write data and the encrypted first tag and the user identifier to the storage device.

17. The operating method of claim 15, further comprising:

encrypting a second tag for identifying read data based on the common temporary key;

transmitting the encrypted second tag and the user identifier to the storage device;

receiving encrypted read data from the storage device in response to the transmitting; and decrypting the encrypted read data based on the common temporary key to obtain the read data.

18. A storage device comprising:

a nonvolatile memory including a secure area assigned to a trusted application a normal area; and a storage controller configured to the nonvolatile memory, wherein the storage controller receives a user identifier assigned to the trusted application from a host device and writes or reads data requested for the secure area from the trusted application based on the user identifier, wherein the storage controller identifies, based on the user identifier, a portion of the secure area corresponding to the trusted application, and wherein the user identifier is information generated based on device information including at least one of information, associated with the trusted application and the storage device, and information associated with a processor in which the trusted application is executed, and wherein the device information comprises hardware-dependent attributes including hardware platform information.

19. The storage device of claim 18, wherein the storage controller receives encrypted write data and an encrypted first tag and the user identifier from the host device, decrypts the encrypted write data and the encrypted first tag based on a common temporary key obtained through temporary key exchange with the host device, and stores the write data in the secure area corresponding to the user identifier and in a location of the secure data corresponding to the first tag.

20. The storage device of claim 18, wherein the storage controller receives an encrypted second tag and the user identifier from the host device, decrypts the encrypted second tag based on a common temporary key obtained through temporary key exchange with the host device, reads read data corresponding to the second tag from the secure area corresponding to the user identifier, encrypts the read data to generate encrypted read data, and transmits the encrypted read data to the host device.

* * * * *